A. BARKIN.
SOLDERING IRON.
APPLICATION FILED FEB. 6, 1914.
1,129,442.
Patented Feb. 23, 1915.
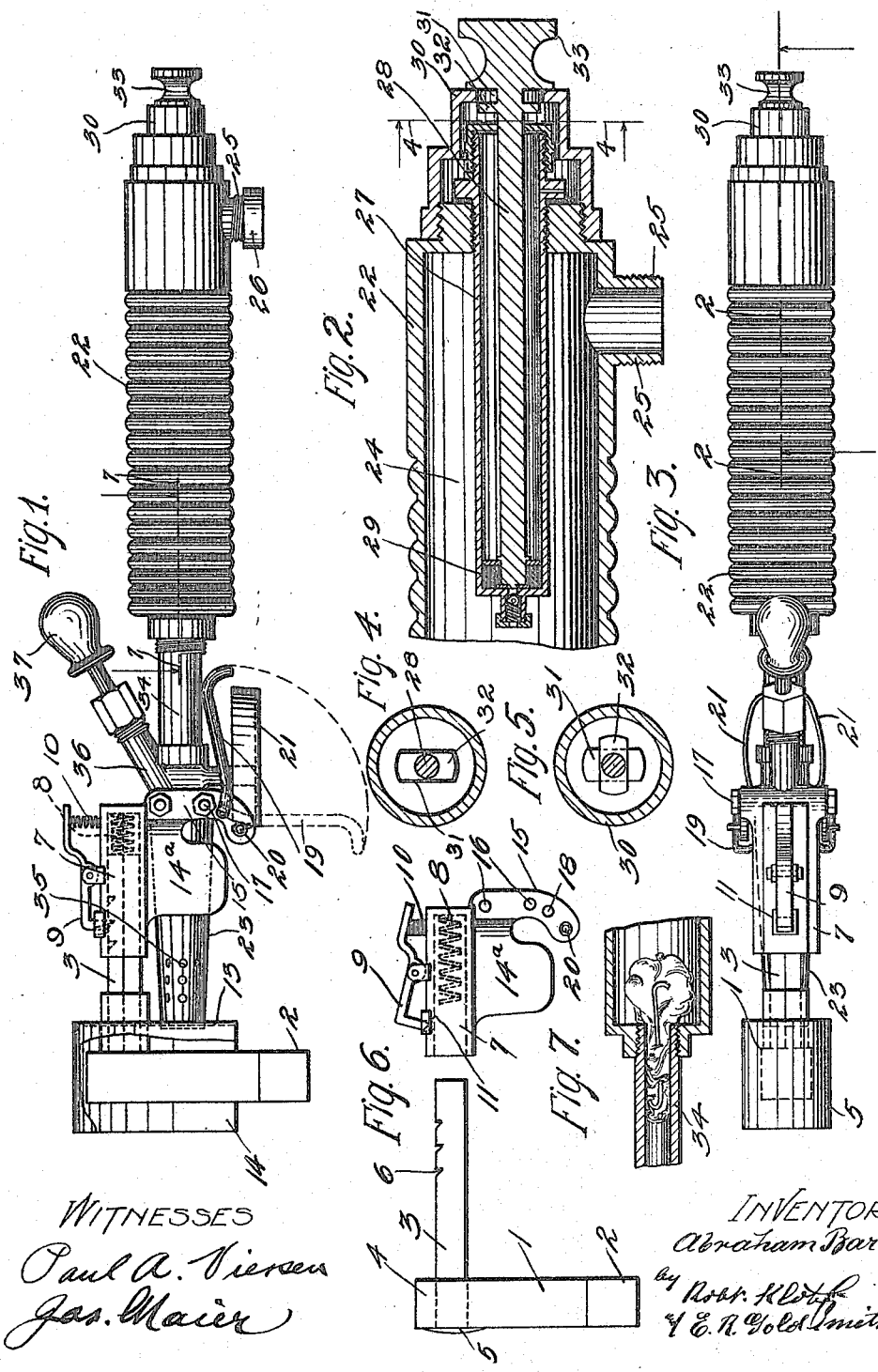

UNITED STATES PATENT OFFICE.

ABRAHAM BARKIN, OF CHICAGO, ILLINOIS.

SOLDERING-IRON.

1,129,442.   Specification of Letters Patent.   Patented Feb. 23, 1915.

Application filed February 6, 1914. Serial No. 816,895.

*To all whom it may concern:*

Be it known that I, ABRAHAM BARKIN, a subject of the Czar of Russia, residing at Chicago, in the county of Cook and State of Illinois, have invented certain new and useful Improvements in Soldering-Irons, of which the following is a specification.

The essential object of this invention is to provide a soldering iron of that type in which the metallic head which comes into contact with the solder is heated by a gasolene or other burner.

More specifically, it is the object of the invention to provide means for attaching the soldering head to the stock or part of the iron where the heat is generated and to provide means for properly supporting the iron when same is not in use in order to prevent contact of the same with the floor or the like.

In the drawings, Figure 1 is an elevation of the invention; Fig. 2 is a longitudinal sectional view on the line 2—2, Fig. 3; Fig. 3 is an elevation taken at right angles to the view of Fig. 1; Fig. 4 is a vertical section on the line 5—5, Fig. 2; Fig. 5 is a vertical section on the same line showing the parts in different positions; Fig. 6 is a detail of the devices at the left end of Fig. 1 showing the soldering head removed from the holder; and Fig. 7 is a detail in section on the line 7—7, Fig. 1.

The soldering head 1 is provided with the usual beveled point 2, and this part is the one which is intended to be rubbed upon the solder as is customary with devices of this character. Said head 1 is made of iron, steel or other suitable material, and in size and shape resembles the old-fashioned soldering irons which were adapted to be heated in a charcoal furnace. The bar 3 is riveted at 5 to the soldering head 1. Said bar 3 is provided with a series of notches 6 comprising a ratchet, and is adapted to be received within a hollow casing 7 which conforms in size and shape to the size and shape of the bar 3. Inside of the casing 7 is the helical spring 8, and pawl 9 controlled by a spring 10 is adapted to project through a slot or recess 11 in the top of the casing 7. When the parts are assembled, as shown in Figs. 1 and 3, the tooth of the pawl 9 projects through the opening 11 and locks with the ratchet 6 and in this manner the soldering head 1 is held in place upon the handle and at any desired distance from the mouth 13 where the heat is applied to the soldering iron. In order to protect the operator as well as more effectively to center the heat from the mouth 13, the head 1 is protected by a hood 14 which may be of any desired size or shape.

The hollow casing 7 within which the bar 3 is received is supported upon a saddle 14ª, which saddle is provided with the ears 15 perforated at 16, and bolts 17 pass through perforations 16 in order to clamp the saddle firmly in place upon the handle. The ears 15 are also perforated at 18 and a strut or stirrup 19 is received within the perforation 18. When said strut 19 is moved from the full line position to the dotted line position, it forms a support upon which the iron may rest and contact of the point 2 with the table or bench is thereby prevented. The ears 15 are also perforated at 20 and a pan or receptacle 21 is secured to said ears at 20, which pan 21 serves to catch the drip, if any, from the handle and prevent the drip from falling upon the metal parts which are being soldered.

The handle 22, which is shown in detail in Fig. 2, is in effect a combined handle and fuel reservoir from which gas or gasolene is supplied to the point of consumption or burner 23. No particular novelty is claimed for the handle itself nor for the broad application of a combined handle and fuel reservoir to a soldering iron. The hollow handle 22, however, is provided with a central chamber 24 which is intended to be filled with gasolene, and gasolene, in turn, can be poured in through the nipple 25 adapted to be closed, when filled, by the cap 26. Inside of the chamber 24 is the cylinder 27 within which the piston rod 28, carrying the piston head 29, is adapted to reciprocate. The purpose and object of the piston 29 is to force air into the chamber 24, as is customary in tools of this character. To the hollow handle 24 the cap 30 is screwed, and at one end said cap 30 is provided with a slot 31. Upon the piston rod 28 is the plate 32 which corresponds in size and shape to the slot 31. When the parts are turned to the position shown in Fig. 5 and when the plate 32 is on the inside of the cap 30, as shown in Fig. 2, the piston 29 will be locked in place. When it is desired to operate the piston, however, the user grasps the knob 33, rotates the rod 28 until the plate 32 is in exact registration with the opening 31, as shown in Fig. 4, and when the parts are in the position of Fig. 4, the piston can be moved toward the right, Fig. 2, and air pumped into the hollow handle 22.

At its left end, Fig. 1, the hollow handle 22 is connected to the pipe 34 through which the gasolene is adapted to pass, escaping into the funnel-like member 23 where the combustion takes place. A tube 36 is mounted adjacent to the pipe 34 and houses a valve 37 for the control of the gasolene. As hereinabove stated, however, the invention does not reside in the construction of the handle, though same is described somewhat in detail, but the principal features of novelty are the means for supporting the soldering head upon the handle, the means for supporting the handle so that the soldering head cannot engage the table or bench, and the means for catching the drip from the handle.

It will be obvious that the specific embodiment of the invention shown in the drawings and described in the specification may be modified in many respects without departing from the scope of the appended claims.

I claim as my invention:

1. The combination with a handle, of a feed pipe secured thereto and terminating in a burner, a saddle secured to said pipe comprising a U-shaped body portion spanning said pipe and a pair of depending curved drums or ears formed on said body portion, a rectangular casing closed at one end and mounted on said U-shaped body portion of the saddle, a spring contained within said casing and bearing against the closed end thereof, and a bar mounted for reciprocation in said casing and arranged to compress said spring.

2. The combination with a handle, of a feed pipe secured thereto and terminating in a burner, a saddle secured to said pipe comprising a U-shaped body portion spanning said pipe and a pair of depending curved drums or ears formed on said body portion, a rectangular casing closed at one end and mounted on said U-shaped body portion of the saddle, a spring contained within said casing and bearing against the closed end thereof, a bar mounted for reciprocation in said casing and arranged to bear against and compress the spring therein, means piercing said casing for locking the bar aforesaid against the action of said spring, a supporting strut pivoted to said curved ears, and a pan secured to said ears so that the strut may pass the same during its pivotal movement.

In testimony whereof I hereunto affix my signature in the presence of two witnesses.

ABRAHAM BARKIN.

Witnesses:
  ROBT. KLOTZ,
  MAY D. FLYNN.

Copies of this patent may be obtained for five cents each, by addressing the "Commissioner of Patents, Washington, D. C."